US009953287B1

(12) United States Patent
McDonald, Jr. et al.

(10) Patent No.: US 9,953,287 B1
(45) Date of Patent: Apr. 24, 2018

(54) UTILIZING AUTOMATED AERIAL VEHICLES FOR TRANSPORTING PRIORITY PICK ITEMS

(71) Applicant: Amazon Technologies, Inc., Reno, NV (US)

(72) Inventors: Robert Dreaper McDonald, Jr., Seattle, WA (US); Facundo Leonardo Agriel, Seattle, WA (US); Eitan S. Levi, Seattle, WA (US); Vishal Nandkishor Patel, Seattle, WA (US); Maitreyi Nanjanath, Bangalore Karnataka (IN); Udit Madan, Seattle, WA (US); David Daniel Glick, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 558 days.

(21) Appl. No.: 14/321,089

(22) Filed: Jul. 1, 2014

(51) Int. Cl.
B64C 39/02 (2006.01)
G06Q 10/08 (2012.01)
G05D 1/10 (2006.01)

(52) U.S. Cl.
CPC ......... *G06Q 10/0832* (2013.01); *B64C 39/02* (2013.01); *B64C 2201/128* (2013.01); *G05D 1/101* (2013.01)

(58) Field of Classification Search
CPC ............... G06Q 10/0832; B64C 39/02; B64C 2201/128; G05D 1/101
USPC ................. 235/385, 353; 705/9, 7, 8, 28, 22
See application file for complete search history.

(56) References Cited

U.S. PATENT DOCUMENTS

| 4,954,962 | A | 9/1990 | Evans et al. | |
| 5,040,116 | A | 8/1991 | Evans et al. | |
| 6,622,127 | B1* | 9/2003 | Klots | G06F 17/30902 705/22 |
| 7,158,856 | B2* | 1/2007 | Sheehan | G05B 19/4182 340/517 |
| 8,511,606 | B1 | 8/2013 | Lutke et al. | |
| 8,899,903 | B1 | 12/2014 | Saad et al. | |
| 9,280,757 | B2* | 3/2016 | Parpia | G06Q 10/087 |
| 2009/0012836 | A1* | 1/2009 | Weissbach | G06Q 10/063 705/7.11 |

(Continued)

OTHER PUBLICATIONS

"Qimarox examines the use of drones for palletizing", published by www.youtube.com/watch?v=ZHOx-61CkJk, on Jan. 26, 2014.*

(Continued)

*Primary Examiner* — Kevin H Flynn
*Assistant Examiner* — Omar Zeroual
(74) *Attorney, Agent, or Firm* — Athorus, PLLC

(57) ABSTRACT

This disclosure describes a system and method for utilizing an automated aerial vehicle for rapidly transporting a priority pick item when an exception occurs (e.g., an item that was to be picked from another location or otherwise processed is found to be missing or damaged). In some implementations, a priority pick instruction may be generated that directs picking of the item from an alternative location after which the item may be transported by the automated aerial vehicle to a processing location (e.g., a problem solve station). A flight path may be determined which may have starting and ending points at designated locations where the automated aerial vehicle can safely land and take off for acquiring and/or delivering the priority pick item.

19 Claims, 10 Drawing Sheets

(56) References Cited

U.S. PATENT DOCUMENTS

| | | |
|---|---|---|
| 2011/0035149 A1 | 2/2011 | McAndrew et al. |
| 2011/0084162 A1* | 4/2011 | Goossen ............... B64C 39/024 244/12.1 |
| 2011/0264311 A1 | 10/2011 | Lee et al. |
| 2013/0081245 A1 | 4/2013 | Vavrina et al. |
| 2013/0110281 A1* | 5/2013 | Jones .................... G06Q 10/08 700/228 |
| 2013/0317642 A1* | 11/2013 | Asaria .................... G06Q 50/28 700/216 |
| 2014/0022055 A1 | 1/2014 | Levien et al. |
| 2014/0032034 A1* | 1/2014 | Raptopoulos ........ G08G 5/0069 701/25 |
| 2014/0254896 A1* | 9/2014 | Zhou ..................... B25J 9/0006 382/124 |
| 2014/0277854 A1* | 9/2014 | Jones .................... G05D 1/102 701/3 |
| 2015/0102154 A1 | 4/2015 | Duncan et al. |
| 2015/0153175 A1 | 6/2015 | Skaaksrud |
| 2015/0158599 A1 | 6/2015 | Sisko |
| 2015/0175276 A1 | 6/2015 | Koster |
| 2015/0178671 A1* | 6/2015 | Jones ................... G06Q 10/087 705/28 |
| 2015/0183528 A1 | 7/2015 | Walsh et al. |
| 2015/0317597 A1 | 11/2015 | Shucker et al. |
| 2015/0332206 A1 | 11/2015 | Trew et al. |
| 2015/0370251 A1 | 12/2015 | Siegel et al. |
| 2016/0033966 A1 | 2/2016 | Farris et al. |
| 2016/0299233 A1 | 10/2016 | Levien et al. |
| 2016/0334229 A1 | 11/2016 | Ross et al. |

OTHER PUBLICATIONS

"Qimarox examines the use of drones for palletising" published on Mar. 7, 2014 by www.qimarox.com, p. 1.*

* cited by examiner

… (1)

UTILIZING AUTOMATED AERIAL VEHICLES FOR TRANSPORTING PRIORITY PICK ITEMS

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

To deliver these products to the customer, the operators of the materials handling facilities often coordinate with one or more carriers (e.g., Federal Express®, U.S. Post Office™, DHL®, UPS®) to retrieve the ordered items from the materials handling facility and transport them to the customers. The carriers often schedule departure times identifying when each truck or other transportation unit will depart the materials handling facility. To ensure that the ordered items are ready to be loaded into the truck or other transportation unit prior to the scheduled departure time, schedules may be set that indicate deadlines by which the items must be retrieved or "picked" from inventory and packed in preparation for shipment. A specified time by which an item must be picked from inventory may be referred to in some instances as a critical pull time ("CPT"). Occasionally, an "exception" may occur in the normal picking or later processing (e.g., an item may be missing at a location from where it was supposed to be picked), which can disrupt the schedule or otherwise result in a missed ship date for the item if the problem is not otherwise addressed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
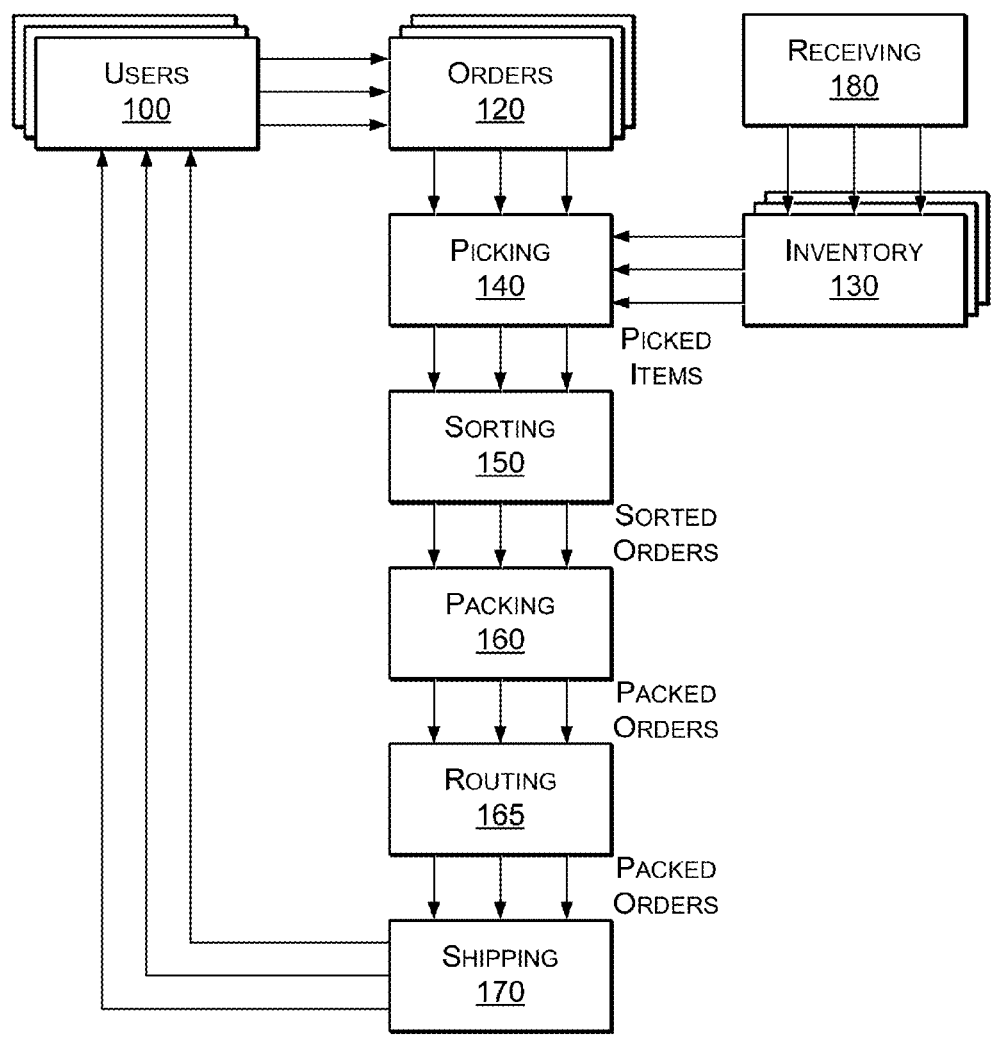
FIG. 1 illustrates a broad view of the operations of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and method for utilizing automated aerial vehicles for transporting priority pick items. Multiple bins may be on shelves of bays within a materials handling facility and each of the bins may be used to store one or more items of inventory. Once an order for an item is received, a database may be accessed indicating multiple locations (e.g., bins) in the materials handling facility where identical versions of the item are supposed to be available for picking, and a pick instruction may be generated for picking the item from one of the locations. However, as part of the picking process or during later processing, an exception may be indicated as having occurred with regard to the item. For example, an exception may be indicated if the item is missing from the bin where it was supposed to be picked. As another example, the item may be picked but may be determined to be damaged or otherwise unsuitable for inclusion in the order that is to be fulfilled. In various implementations, once an exception is indicated, a priority pick instruction may be automatically generated for picking the item from an alternative location in the facility.

In various implementations, priority pick instructions may generally be considered to be more urgent than regular pick instructions. For example, a priority pick instruction may be associated with a last item that is otherwise blocking a shipment for an order from leaving the materials handling facility. Such priority pick instructions may also be generated relatively close to a critical pull time for an item. In various implementations, an automated aerial vehicle (also referred to herein as an "AAV") may be associated with the priority pick instruction for rapidly transporting the priority pick item to a processing delivery location.

In various implementations, an AAV may generally be able to transport a priority pick item more quickly than a human agent. For example, a human agent may require a significant amount of time to traverse through a large materials handling facility (e.g., 10, 15, 30 or more minutes) to pick an item. In contrast, an AAV may be able to travel much more quickly (e.g., travelling between the same start and stop points as a human agent in just a few minutes to one minute or less). In addition to rapid AAV flying speeds, such travel times are further improved by an ability to fly over, under, or around certain obstacles (e.g. bays, safety barriers, etc.) and/or to utilize certain access ways and/or to travel between floors without utilizing staircases or other pathways that would otherwise be required for a human agent.

When AAVs are utilized for transporting priority pick items, designated areas may be established where the AAVs can safely land and take off for acquiring and delivering the priority pick items. For the acquisition of priority pick items, various item acquisition locations may be established. In some instances, the item acquisition location may be at or near a current location of a priority pick item. For example, if the item will be picked by a human or robotic agent and placed in the AAV, the item acquisition location may include a designated AAV landing area (e.g., on top of a bay where the item is stored). As another example, the AAV itself may have robotic capabilities for picking or otherwise engaging the item from a storage location or a location where the item has been placed by an agent for pickup.

In various implementations, after an AAV has acquired a priority pick item, the AAV may deliver the item to a processing delivery location. For example, the processing delivery location may include an area where an AAV can safely land and/or drop off an item, which does not endanger human agents or otherwise interfere with other processing operations at an associated processing location. In various implementations, the processing delivery location may also be associated with a conveyor, robotic agent or other transportation mechanism for transporting the priority pick item to the processing location once the priority pick item is delivered by an AAV.

In various implementations, data regarding the item acquisition location and the processing delivery location may be utilized to determine flight paths for the AAV. For example, the data may include coordinates or other representations of the item acquisition location and the processing delivery location, which may be utilized in combination with a virtual representation of the materials handling facility through which the AAV will navigate. If unexpected obstacles are encountered (e.g., signs, bays, safety barriers, etc.), the flight path may be modified to avoid the obstacles. When an obstacle is determined to be a human, special precautions may be taken. For example, the AAV may be instructed to alter the flight path to avoid the human by a significant distance, or to wait until the human leaves the area before attempting to fly in the area, or the AAV and/or the materials handling facility management system may provide a notification (e.g., audible or electronic) to the human that the AAV requires access to the area as part of an urgent priority pick operation.

If multiple AAVs are approaching a processing delivery location at the same time, collision avoidance techniques may be utilized. For example, as a departure time for a transportation unit (e.g., a truck) approaches, the frequency of items arriving that are to be included on the transportation unit may increase. As a result, more exceptions may be discovered and more priority pick instructions may correspondingly be issued, which may result in multiple AAVs approaching the processing delivery location at approximately the same time. In such a circumstance, collision avoidance techniques may be utilized (e.g., a materials handling facility management system may coordinate the timing of the landings).

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling. A bay, as used herein, is any physical structure or location at which one or more items of inventory may be stored or otherwise located. A bay may be divided into one or more bins in which content (e.g., items) is stored. For example, a bay may include a series of shelves and the shelves may be divided into one or more bins. Alternatively, the bay and the bin may both constitute a location within the materials handling facility for storing a large item or a large quantity of items (e.g., a pallet of items). In such an instance, the bay may include only a single bin. As will be appreciated, a bay includes at least one bin, but may include any number of bins. In some implementations, a bay may be mobile and configured such that it can be transported by a mobile drive unit.

A block diagram of a materials handling facility, which, in one implementation, may be an order fulfillment facility configured to utilize various systems and processes described herein, is illustrated in FIG. 1. In this example, multiple users 100 may submit orders 120, where each order 120 specifies one or more items from inventory 130 to be shipped to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. An item that has been assigned for shipment from the material handling facility but has not yet been retrieved (picked) from its inventory location is considered a "pre-picked" item. Items that have been retrieved from their inventory location but are not yet packed are considered "post-picked" items. Finally, items that have been retrieved and packed are considered "packed items." In some implementations, the items of a user order may be divided into multiple shipment sets for fulfillment by an order planning system before fulfillment instructions are generated (not shown).

In this example, picked items may be routed to one or more stations in the order fulfillment facility for sorting 150 into their respective shipment sets and for packing 160. The routing of items through a materials handling facility (e.g., routing from picking 140, to sorting 150, to packing 160, to shipping 170, or any combination thereof) is generally referred to herein as a "process path."

A package routing operation 165 may sort packed orders for routing to one of two or more shipping operations 170, from which they may be shipped to the users 100. The package routing operation 165 may in various implementations be automated or manual. The package routing operation 165 may receive an indication of the destination to which each packed order should be routed from a central control system and an identification of a transportation unit that is to be used to transport the packed order. Based on this information and information about the packed order, or items in the packed order, the order may progress through the materials handling facility via one or more process paths.

In some implementations, the routing operation may route the picked or sorted items to a particular packing station 160 depending upon the size or type of the packaging into which the items are to be packaged. This again may be considered part of the process paths that are used when moving items within the materials handling facility. For example, not all shipping packages utilized in the facility may be available at all of the packing stations 160. Similarly, some packing stations 160 may not have access to protective materials recommended for shipping fragile items or items for which additional protection may be appropriate. Therefore, if a shipment set requires special packaging, a routing operation may be configured to direct the item(s) to a packing station 160 at which an appropriate shipping package and/or protective materials are available. Likewise, if a fragile item is designated for packing into a delivery package or transfer package, it may be routed to a packing station (not shown) at which appropriate protective material or packaging is available to allow for proper handling of the item(s). As another example, if an item has been designated for gift wrapping (e.g., the user has selected to have the item gift wrapped), the item may be routed to a packing station that provides the operation of gift wrapping the item before it is packed.

In some implementations, items received at receiving 180 may not be stock inventory and may be processed and delivered to the package routing operation 165 for shipping 170 to the user 100. For example, receiving 180 may receive an item from a merchant that is to be delivered to a user 100. In another example, receiving 180 may receive items from another materials handling facility or another vendor destined for a user 100.

Note that not every fulfillment facility may include both sorting and packing stations. In certain implementations, agents may transfer picked items directly to a packing station, such as packing station 160, while in other implementations, agents may transfer picked items to a combination of sorting and packing stations (not illustrated). This may result in a stream and/or batches of picked items for multiple incomplete or complete shipment sets being delivered to a sorting station for sorting 150 into their respective shipment sets for packing and shipping, according to one implementation.

Portions of a shipment set may be received at different times or during different time intervals. When portions of a shipment set do not arrive during the same time interval, sorting 150 and packing 160 may have to wait for one or more items of some shipment sets to be delivered to the sorting station(s) before processing of the shipment set can be completed. Note that a picked, packed and shipped shipment set does not necessarily include all of the items ordered by the user; a shipped shipment set may include only a subset of the ordered items available to ship at one time from one materials handling facility. Also note that the various operations of a materials handling facility may be located in one building or facility, or alternatively may be spread or subdivided across two or more buildings or facilities.

As used herein, an "item" may be any individual physical item or a group of items that are handled as a single unit. For example, a pallet of packages that is being treated as a single item for routing through a materials handling facility, may be considered an item as utilized in the present disclosure. As another example, an "item" also includes a single package, tote, bin and/or other container in which one or more items are placed/stored for handling as a group.

The arrangement and order of operations illustrated by FIG. 1 is merely one example of many possible implementations of the operation of a materials handling facility, such as an order fulfillment facility. Other types of materials handling, manufacturing, or order fulfillment facilities may include different, fewer, or additional operations and resources, according to different implementations.

Figure 2:
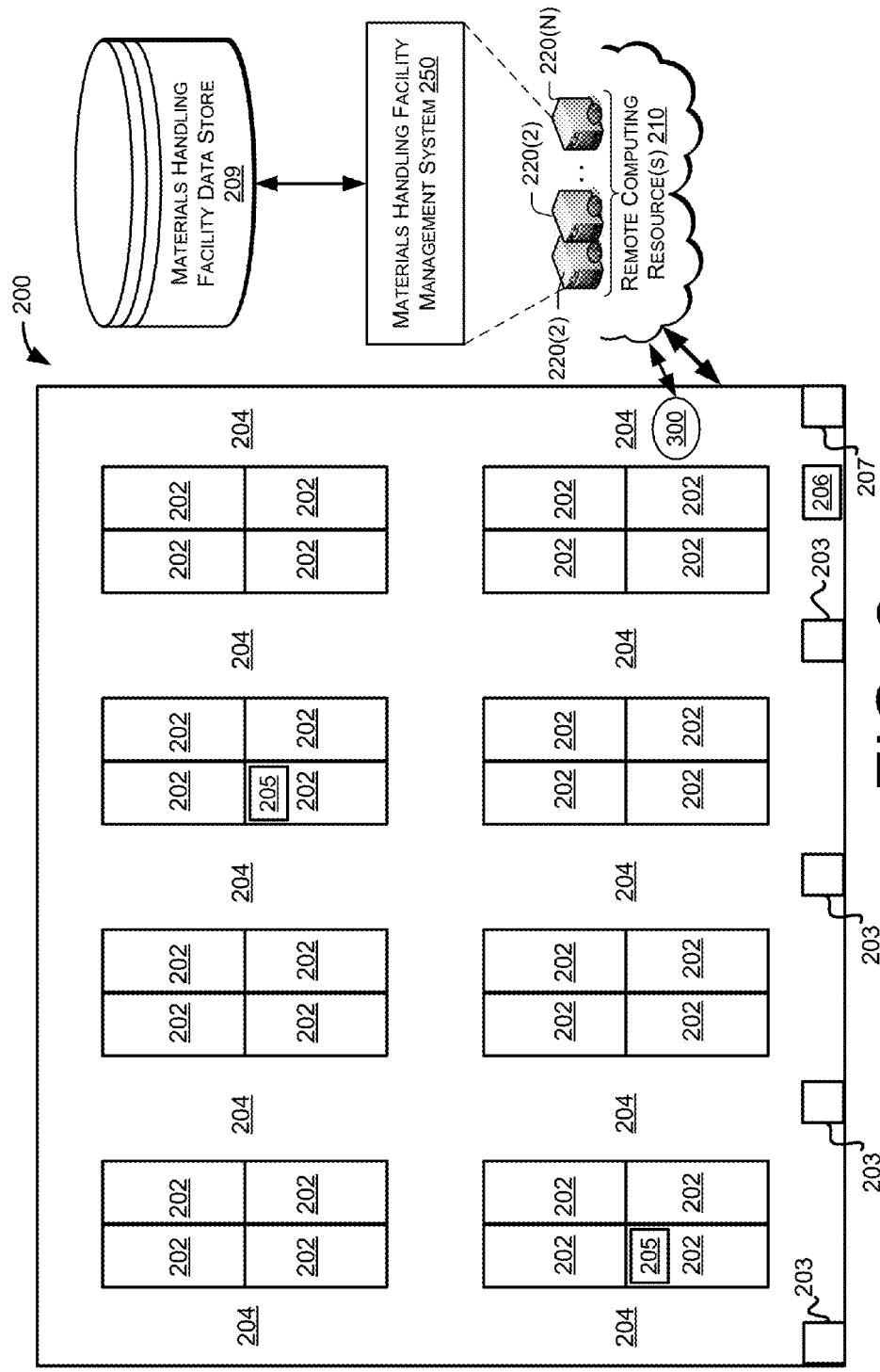
FIG. 2 is a block diagram illustrating top down view of a storage area within a materials handling facility, according to some implementations.

FIG. 2 is a block diagram illustrating a top down view of a storage area 200 within a materials handling facility configured to store inventory items, according to some implementations. As shown, the storage area includes bays 202 for storing inventory items. Any number, type and/or size of bays may be included in the storage area. As shown, multiple bays 202 may be arranged adjacent to one another and/or across from one another to establish a series of rows within the storage area 200. In this example, the bays 202 are arranged in rows 204 such that an agent may progress through the rows. For example, an agent may progress through the rows 204, pick items from bins of the bays 202, and/or store items in bins of the bays 202.

In various implementations, any number of storage areas 200 may be located throughout a given materials handling facility. Such storage areas 200 may be located on different floors, and in some instances may be organized in a "stacked" configuration. For example, in an area of the materials handling facility that has a high ceiling, a structure may be utilized including different levels of storage areas 200 that are accessible by agents using stairs or other means for moving between the levels. In some instances, such a structure may be open on one end with safety barriers for agents but may otherwise allow for access (e.g., by an AAV) to the different levels, as will be described in more detail below.

The materials handling facility may be configured to receive different kinds of inventory items from various suppliers, vendors, etc., and to store those items until a customer orders or retrieves one or more of the items. In various implementations, items may include merchandise, commodities, perishables, or any suitable type of item depending on the nature of the enterprise that operates the materials handling facility.

Upon being received from a supplier, items may be prepared for storage in the storage area 200. For example, in some implementations, items may be unpacked or otherwise rearranged, and a materials handling facility management system 250 (which, as described below, may include one or more software applications executing on a computer system) may be updated to reflect the type, quantity, condition, cost, location or any other suitable parameters with respect to newly received items. It is noted that items may be stocked, managed or dispensed in terms of countable, individual units or multiples of units, such as packages, cartons, crates, pallets or other suitable aggregations. Alternatively, some items such as bulk products, commodities, etc., may be stored in continuous or arbitrarily divisible amounts that may not be inherently organized into countable units. Such items may be managed in terms of measurable quantities such as units of length, area, volume, weight, time duration or other dimensional properties characterized by units of measurement. Generally speaking, a quantity of an item may refer to either a countable number of individual or aggregate units of an item or a measurable amount of an item, as appropriate.

After arriving and being prepared for storage, items may be stored within the storage area 200. In some implementations, like items (e.g., identical versions of the same item that may be utilized interchangeably to fulfill an order for the item) may be stored or displayed together in one or more bins of a bay, or adjacent bins, such that all items of a given kind are stored in one location. In other implementations, like items may be stored in different locations. For example, to optimize retrieval of certain items having high turnover within a large physical facility, those items may be stored in several different bins throughout the storage area 200 to reduce congestion that might occur at a single point of storage. Like items may also be stored in different locations for other reasons (e.g., more convenient processing for storing the items, greater efficiencies for the storage and/or picking processes, etc.)

When a customer order specifying one or more items is received, the corresponding items may be selected or "picked" from a bin within the storage area 200. In various implementations, item picking may range from manual to completely automated picking. In other implementations, materials handling facility employees (agents) may pick items using written or electronic pick lists derived from customer orders and place picked items into a tote, cart, etc., as the materials handling facility agent progresses through the storage area 200.

Alternatively, or in addition thereto, some or all of the bays may be mobile, also referred to herein as inventory holders, and configured so that a mobile drive unit (not shown) can retrieve the bay and deliver it to an operating location 203. When the bay arrives at the operating location, an agent located at the operating location may perform one or more operations (e.g., picking and/or stowing). After the agent has completed operations, the bay may be removed from the operating location by the mobile drive unit and returned to a storage location, taken to another operating location, etc.

The storage area 200 may also include or be in communication with the materials handling facility management system 250 that is configured to receive and/or provide information to agents, AAVs, mobile drive units, and/or other entities within the storage area 200 or other areas of the materials handling facility. Generally, the materials handling facility management system 250 may include one or more communication devices that facilitate wireless communication (e.g., Wi-Fi, NFC, Bluetooth) between the materials handling facility management system 250 and one or more AAVs 300 (e.g., as will be described in more detail below with respect to FIGS. 3 and 4).

The materials handling facility management system 250 may be implemented on one or more computing resources. The computing resources may be local and/or remote. As illustrated, the materials handling facility management system 250 is implemented on remote computing resources 210, which may include one or more servers 220(1), 220(2), . . . , 220(N) and may, in some instances, form a portion of a network-accessible computing platform implemented as a computing infrastructure of processors, storage, software, data access, etc. The computing resources 210 do not require end-user knowledge of the physical location and configuration of the system that delivers the services. Common expressions associated for the remote server system 220 include "on-demand computing," "software as a service (SaaS)," "platform computing," "network-accessible platform," "cloud services," "data centers," and so forth.

The computing resources 210 may also include a data store 209, and/or other data stores. As discussed further below, the data stores may include lists, arrays, databases, and other data structures used to provide storage and retrieval of data. In some implementations, the data stores may be configured as a single data store or multiple data stores.

In various implementations, the data store 209 may include stored information related to operations, inventory and virtual representations of the materials handling facility. For example, information related to user orders, picking and other processing operations, and related inventory locations may be accessed and utilized when exceptions occur and priority pick instructions are generated. With regard to inventory locations, in various implementations the data store 209 may contain stored bin content information, and may also include bay configuration information. Stored bay configuration information may include information about each bay, such as the number and/or arrangement of bins within the bay, the location of the bay within the storage area 200, a virtual representation of the bay configuration, the identifiers associated with the bay, etc. With regard to the determination of flight paths for AAV's, as will be described in more detail below, virtual representations of the storage area 200 and other areas of the materials handling facility, including the coordinates of engagement locations and processing delivery locations, may be stored and utilized.

The data store 209 may be integrated with the materials handling facility management system 250 or otherwise communicatively coupled with the materials handling facility management system 250. For example, the data store 209 may be located at a remote computing resource and communicatively coupled with the server system 220 that implements the materials handling facility management system 250. In some implementations, the data store 209 may include one or more CD-RW/DVD-RW drives, hard disk drives, solid-state drives, tape drives, or other storage devices that are utilized to store digital content and information.

The materials handling facility management system 250 may utilize antennas within the materials storage area 200 of the materials handling facility to create a local wireless network (e.g., Wi-Fi) so that an AAV 300 can connect to and communicate with the materials handling facility management system 250. Likewise, in instances when one or more of the components of the materials handling facility management system 250 are remote from the materials handling facility and/or the storage area 200, those components may communicate with other components of the materials handling facility management system 250 and/or the AAV 300 via a network.

The organization and operation of the storage area 200 within a materials handling facility described above is given as an example. In other implementations, a materials handling facility and/or storage area may be arranged differently and operate differently than described above.

As discussed in more detail below, as items are picked and/or as inventory within the storage area is replenished with new inventory, the actual items in a bin may begin to vary from the virtual inventory maintained by the materials handling facility management system 250 as to what items should be included in the bin. For example, if new inventory is being added to a bin within the storage area, the agent may place the item in an adjacent bin rather than the bin in which the item is expected to be stored. As another example, an item may fall from a bin and when replaced, it may be placed in a different bin. Likewise, in other instances, an agent may pick the wrong item from the bin, resulting in the stored bin inventory information not matching the actual bin inventory. In addition to these types of issues, items that are stored in the bins may also be damaged or otherwise rendered unsuitable for use in fulfilling an order from a user. Similar issues regarding missing, damaged or otherwise unsuitable items may also occur further down the processing paths, such as at the sorting or packing operations described above with respect to FIG. 1.

In some instances, such issues may be discovered by an agent who is following instructions related to the item (e.g., for picking, sorting, packing, etc.) When such an issue occurs, the agent who was responsible for the picking or other processing of the item may make a corresponding entry on an electronic input device or other mechanism to indicate to the materials handling facility management system 250 what has happened (e.g., indicating that the item is missing, damaged, etc.). Such issues may be defined as "exceptions" which may occur and/or be discovered during the processing of the items. In various implementations, in response to an indication of an exception occurring, the materials handling facility management system 250 may issue a priority pick instruction for picking an identical version of the item from another location in the facility. As will be described in more detail below, in various implementations an AAV 300 may be associated with the priority pick instruction for rapidly transporting the priority pick item to a processing delivery location.

In general, when an agent discovers an exception, the agent may be instructed to take any other items that are also part of the user order to a processing location 207 (e.g., a problem solve station). In various implementations, such processing locations 207 may be stationed throughout a materials handling facility, and may include designated locations where items in an order may be taken once an exception or other problem occurs. While the processing location 207 in FIG. 2 is illustrated near the storage area 200, such processing locations may be located anywhere throughout the materials handling facility (e.g., near sorting or packing areas, near different storage areas, etc.)

In various implementations, a priority pick instruction may indicate that once the item is picked (e.g., from a bin of a bay 102 which may be in the storage area 200 or in a different far-away storage area), it should be transported to a designated processing location 207. Once a priority pick item arrives at the processing location 207, if there were other items from the order that were previously taken to the processing location, the priority pick item may be placed with the other items so that all of the items in the order can be processed together (e.g., for packing and shipping). In various implementations, the other items that are to be shipped with the priority pick item as part of the order may continue to be processed after the exception occurs, wherein the priority pick item will later be delivered to rejoin the other items at a point further along the processing path. For example, the other items may be further processed by sorting and/or packing operations, in which case the processing location may be designated as a location in the materials handling facility where the additional items will be after the sorting and/or packing operations have been performed.

As will be described in more detail below, when AAVs are utilized for transporting priority pick items, designated areas may be established where the AAVs can safely land and take off for acquiring and delivering the priority pick items. For the acquisition of priority pick items, various item acquisition locations 205 may be established. In some instances, the item acquisition location may be at or near a current location of a priority pick item (e.g., which may be stored in a bin of a bay 102). For example, if the item will be picked by a human or robotic agent and placed in the AAV, the item acquisition location 205 may include a designated AAV area (e.g., on top of one of the bays 102) near the current item location. Similarly, the agent may place the item at an item acquisition location or on a conveyor or other transport mechanism for transporting the item to an item acquisition location where the AAV is able to land on and/or otherwise engage the item. As another example, the AAV itself may have robotic capabilities for picking the item from its current location, in which case the item acquisition location may be the current item location (e.g., in a bin of a bay 102).

In various implementations, an item acquisition location 205 may also be a designated AAV area (e.g., on top of a bay 102) where the AAV may land for recharging and/or may generally reside when not in use. In one implementation, the item acquisition location 205 may be included within its own designated bin, and may include a landing platform (not shown). The landing platform and/or other parts of the item acquisition location 205 may include charging and/or communication port capabilities for the AAV 300, wherein the AAV 300 may have navigation capabilities for landing on and connecting to such charging and/or communication port facilities (e.g., including plugs, guide rails, inductive capabilities, etc.). A determination of when an AAV 300 should land for charging may be made by the AAV 300 or by remote computing resources 210. The landing platform may also provide a suitable separation and height for the item acquisition location 205 so that the AAV 300 will not interfere with adjacent bins when it takes off or lands. In another implementation, a cover may be provided over the bay 202 on top of which the item acquisition location 205 may be located.

In various implementations, after an AAV has acquired a priority pick item, the AAV may be instructed to deliver the item to a processing delivery location 206 which may be located at or near an associated processing location 207, such as that described above. For example, the processing delivery location 206 may include an area where an AAV can safely land and/or drop off an item, which does not endanger human agents or otherwise interfere with other processing operations at an associated processing location 207. In various implementations, the processing delivery location 206 may also be associated with a conveyor, robotic agent or other transportation mechanism for transporting the priority pick item to the processing location 207 once the priority pick item is delivered by an AAV. Similar to the item acquisition locations 205 described above, in some implementations the processing delivery location 206 may also be a designated AAV area where the AAV may land for recharging, communications, and/or may generally reside when not in use.

Figure 3:
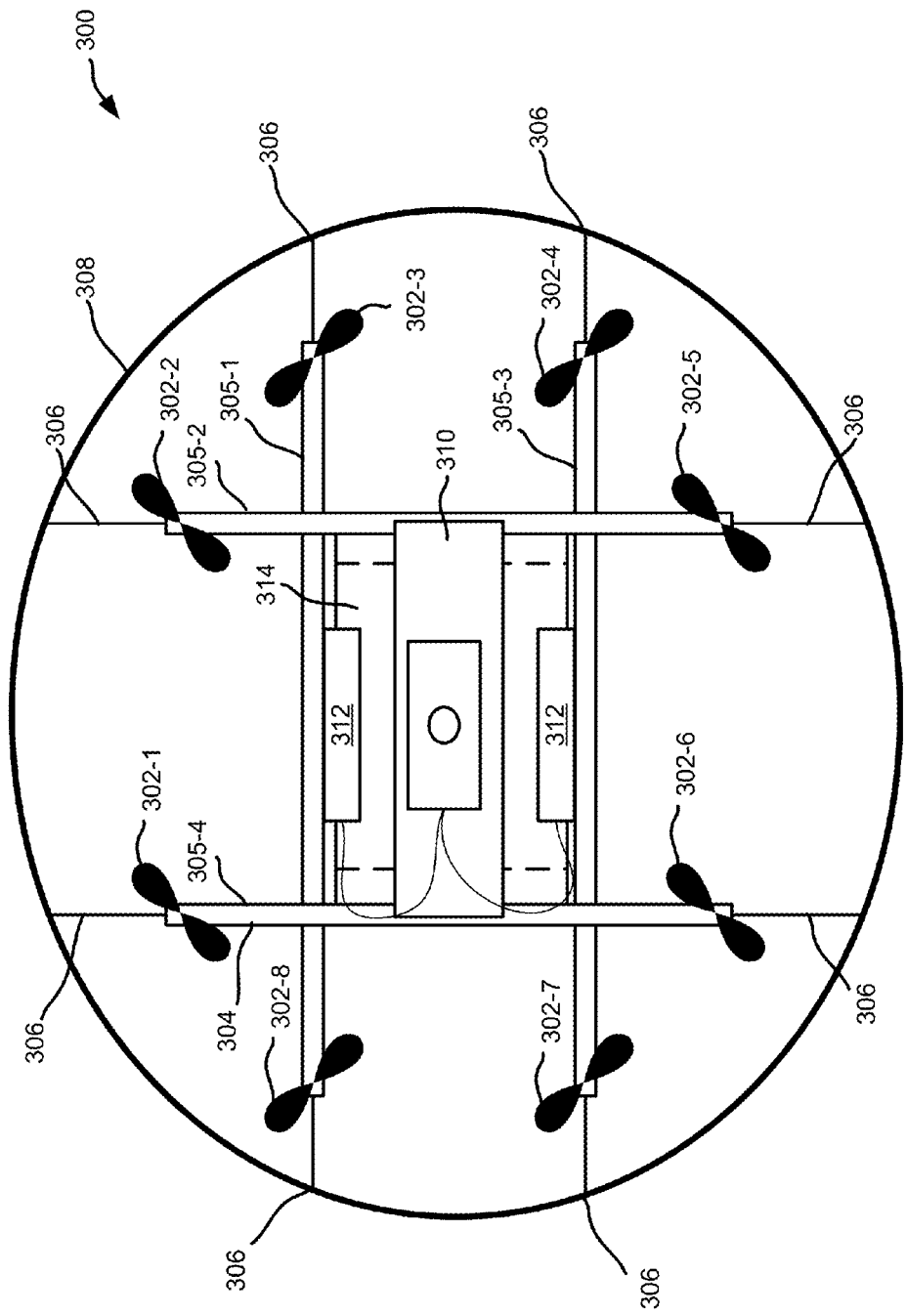
FIG. 3 depicts a block diagram of a top-down view of an automated aerial vehicle for transporting priority pick items, according to an implementation.

FIG. 3 illustrates a block diagram of a top-down view of an AAV 300, according to an implementation. As illustrated, the AAV 300 includes eight propellers 302-1, 302-2, 302-3, 302-4, 302-5, 302-6, 302-7, 302-8 spaced about the frame 304 of the AAV. The propellers 302 may be any form of propeller (e.g., graphite, carbon fiber) and of a size sufficient to lift the AAV 300 and any item engaged by the AAV 300 so that the AAV 300 can navigate through the air, for example, to deliver a priority pick item to a processing delivery location 206. While this example includes eight propellers, in other implementations, more or fewer propellers may be utilized. Likewise, in some implementations, the propellers may be positioned at different locations on the AAV 300. In addition, alternative methods of propulsion may be utilized. For example, fans, jets, turbojets, turbo fans, jet engines, and the like may be used to propel the AAV.

The frame 304 or body of the AAV 300 may likewise be of any suitable material, such as graphite, carbon fiber and/or aluminum. In this example, the frame 304 of the AAV 300 includes four rigid members 305-1, 305-2, 305-3, 305-4, or beams arranged in a hash pattern with the rigid members intersecting and joined at approximately perpendicular angles. In this example, rigid members 305-1 and 305-3 are arranged parallel to one another and are approximately the same length. Rigid members 305-2 and 305-4 are arranged parallel to one another, yet perpendicular to rigid members 305-1 and 305-3. Rigid members 305-2 and 305-4 are approximately the same length. In some embodiments, all of the rigid members 305 may be of approximately the same length, while in other implementations, some or all of the rigid members may be of different lengths. Likewise, the spacing between the two sets of rigid members may be approximately the same or different.

While the implementation illustrated in FIG. 3 includes four rigid members 305 that are joined to form the frame 304, in other implementations, there may be fewer or more components to the frame 304. For example, rather than four rigid members, in other implementations, the frame 304 of the AAV 300 may be configured to include six rigid members. In such an example, two of the rigid members 305-2, 305-4 may be positioned parallel to one another. Rigid members 305-1, 305-3 and two additional rigid members on either side of rigid members 305-1, 305-3 may all be positioned parallel to one another and perpendicular to rigid members 305-2, 305-4. With additional rigid members, additional cavities with rigid members on all four sides may be formed by the frame 304. As discussed further below, a cavity within the frame 304 may be configured to include an item engagement mechanism for the engagement, transport and delivery of item(s) and/or containers that contain item(s).

In some implementations, the AAV may be configured for aerodynamics. For example, an aerodynamic housing may be included on the AAV that encloses the AAV control system 310, one or more of the rigid members 305, the frame 304 and/or other components of the AAV 300. The housing may be made of any suitable material(s) such as graphite, carbon fiber, aluminum, etc. Likewise, in some implementations, the location and/or the shape of the item engagement mechanism and/or any items or containers may be aerodynamically designed. As will be described in more detail below, in some instances a container may be utilized for holding an item, wherein the item engagement mechanism engages the item by engaging the container. For example, specially shaped containers for use with the AAV 300 may be aerodynamically designed and provided at various locations in the materials handling facility, such that an agent is able to select one of the containers and place the item in the container for engagement by the AAV 300. In some implementations, the item engagement mechanism may be configured such that when an item and/or container is engaged it is enclosed within the frame and/or housing of the AAV 300 so that no additional drag is created during transport of the item. In other implementations, the item and/or container may be shaped to reduce drag and provide a more aerodynamic design. For example, if a portion of a container extends below the AAV when engaged, the exposed portion of the container may have a curved shape.

The propellers 302 and corresponding propeller motors are positioned at both ends of each rigid member 305. The propeller motors may be any form of motor capable of generating enough speed with the propellers to lift the AAV 300 and any engaged item thereby enabling aerial transport of the item. For example, the propeller motors may each be a FX-4006-13 740 kv multi rotor motor.

Extending outward from each rigid member is a support arm 306 that is connected to a safety barrier 308. In this example, the safety barrier is positioned around and attached to the AAV 300 in such a manner that the motors and propellers 302 are within the perimeter of the safety barrier 308. The safety barrier may be plastic, rubber, etc. Likewise, depending on the length of the support arms 306 and/or the length, number or positioning of the rigid members 305, the safety barrier may be round, oval, or any other shape.

Mounted to the frame 304 is the AAV control system 310. In this example, the AAV control system 310 is mounted in the middle and on top of the frame 304. The AAV control system 310, as discussed in further detail below with respect to FIG. 4, controls the operation, routing, navigation, communication, object sense and avoid, and the item engagement mechanism of the AAV 300.

The AAV 300 also includes one or more power modules 312. In this example, the AAV 300 includes two power modules 312 that are removably mounted to the frame 304. The power module for the AAV may be in the form of battery power, solar power, gas power, super capacitor, fuel cell, alternative power generation source, or a combination thereof. For example, the power modules 312 may each be a 6000 mAh lithium-ion polymer battery, polymer lithium ion (Li-poly, Li-Pol, LiPo, LIP, PLI or Lip) battery. The power module(s) 312 are coupled to and provide power for the AAV control system 310 and the propeller motors. In some implementations, one or more of the power modules may be configured such that it can be autonomously removed and/or replaced with another power module while the AAV is landed. In some implementations, when the AAV lands at a designated location, the AAV may engage with a charging member at the location that will recharge the power module.

As mentioned above, the AAV 300 may also include an item engagement mechanism 314. The item engagement mechanism may be configured to engage and disengage items and/or containers that hold items. In this example, the item engagement mechanism 314 is positioned within a cavity of the frame 304 that is formed by the intersections of the rigid members 305. The item engagement mechanism may be positioned beneath the AAV control system 310. In implementations with additional rigid members, the AAV may include additional item engagement mechanisms and/or the item engagement mechanism 314 may be positioned in a different cavity within the frame 304. The item engagement mechanism may be of any size sufficient to securely engage and disengage items and/or containers that contain items. In other implementations, the engagement mechanism may operate as the container, containing the item(s) to be delivered. The item engagement mechanism communicates with (via wired or wireless communication) and is controlled by the AAV control system 310.

While the implementations of the AAV discussed herein utilize propellers to achieve and maintain flight, in other implementations, the AAV may be configured in other manners. For example, the AAV may include fixed wings and/or a combination of both propellers and fixed wings. For example, the AAV may utilize one or more propellers to enable takeoff and landing and a fixed wing configuration or a combination wing and propeller configuration to sustain flight while the AAV is airborne.

As will be described in more detail below with respect to FIG. 4, the AAV control system 310 may operate in conjunction with or may otherwise utilize or communicate (e.g., via wired and/or wireless communication) with one or more components of the materials handling facility management system 250. Likewise, components of the materials handling facility management system 250 may generally interact and communicate with the AAV control system 310 and/or communicate with other components of the storage area 200.

Figure 4:
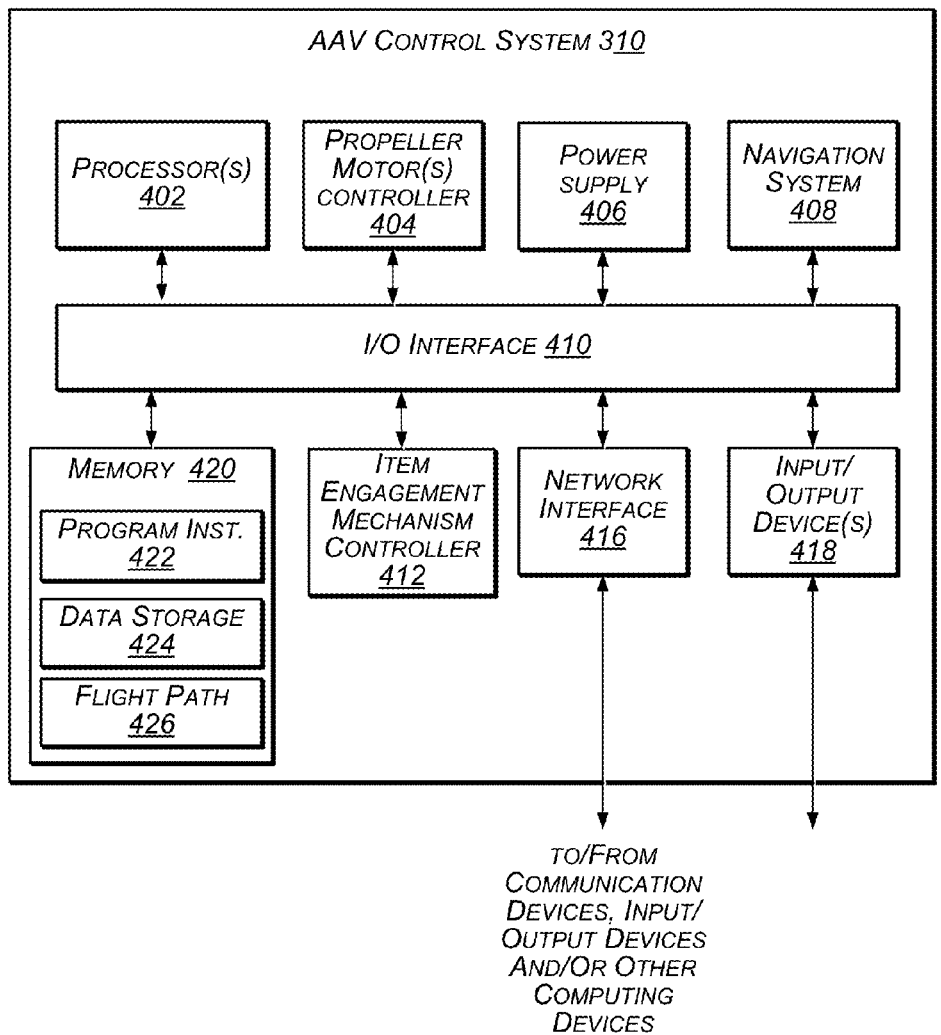
FIG. 4 is a block diagram illustrating various components of an automated aerial vehicle control system, according to an implementation.

FIG. 4 is a block diagram illustrating an example AAV control system 310 of the AAV 300. In various examples, the block diagram may be illustrative of one or more aspects of the AAV control system 310 that may be used to implement the various systems and methods discussed herein. In the illustrated implementation, the AAV control system 310 includes one or more processors 402, coupled to a non-transitory computer readable storage medium 420 via an input/output (I/O) interface 410. The AAV control system 310 may also include a propeller motor controller 404, power supply module 406 and/or a navigation system 408. The AAV control system 310 further includes an item engagement mechanism controller 412, a network interface 416, and one or more input/output devices 418.

In various implementations, the AAV control system 310 may be a uniprocessor system including one processor 402, or a multiprocessor system including several processors 402 (e.g., two, four, eight, or another suitable number). The processor(s) 402 may be any suitable processor capable of executing instructions. For example, in various implementations, the processor(s) 402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 402 may commonly, but not necessarily, implement the same ISA.

The non-transitory computer readable storage medium 420 may be configured to store executable instructions, data, flight paths and/or data items accessible by the processor(s) 402. In various implementations, the non-transitory computer readable storage medium 420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 420 as program instructions 422, data storage 424 and flight path data 426, respectively. In other implementations, program instructions, data and/or flight paths may be received, sent or stored upon different types of computer-accessible media, such as non-transitory media, or on similar media separate from the non-transitory computer readable storage medium 420 or the AAV control system 310. Generally speaking, a non-transitory, computer readable storage medium may include storage media or memory media such as magnetic or optical media, e.g., disk or CD/DVD-ROM, coupled to the AAV control system 310 via the I/O interface 410. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 416.

In one implementation, the I/O interface 410 may be configured to coordinate I/O traffic between the processor(s) 402, the non-transitory computer readable storage medium 420, and any peripheral devices, the network interface or other peripheral interfaces, such as input/output devices 418. In some implementations, the I/O interface 410 may perform any necessary protocol, timing or other data transformations to convert data signals from one component (e.g., non-transitory computer readable storage medium 420) into a format suitable for use by another component (e.g., processor(s) 402). In some implementations, the I/O interface 410 may include support for devices attached through various types of peripheral buses, such as a variant of the Peripheral Component Interconnect (PCI) bus standard or the Universal Serial Bus (USB) standard, for example. In some implementations, the function of the I/O interface 410 may be split into two or more separate components, such as a north bridge and a south bridge, for example. Also, in some implementations, some or all of the functionality of the I/O interface 410, such as an interface to the non-transitory computer readable storage medium 420, may be incorporated directly into the processor(s) 402.

The propeller motor(s) controller 404 communicates with the navigation system 408 and adjusts the power of each propeller motor to guide the AAV along a determined flight path. The navigation system 408 may include a global positioning system (GPS), indoor positioning system (IPS), or other similar system and/or sensors that can be used to navigate the AAV 300 to and/or from a location. The item engagement mechanism controller 412 communicates with the motor(s) (e.g., a servo motor) used to engage and/or disengage items. For example, when the AAV is positioned over a level surface at a delivery location, the item engagement mechanism controller 412 may provide an instruction to a motor that controls the item engagement mechanism to release an item.

The network interface 416 may be configured to allow data to be exchanged between the AAV control system 310, other devices attached to a network, such as other computer systems (e.g., remote computing resources 210), and/or with AAV control systems of other AAVs. For example, the network interface 416 may enable wireless communication between the AAV 300 and the materials handling facility management system 250 that is implemented on one or more of the remote computing resources 210. For wireless communication, an antenna of an AAV or other communication components may be utilized. As another example, the network interface 416 may enable wireless communication between numerous AAVs. In various implementations, the network interface 416 may support communication via wireless general data networks, such as a Wi-Fi network. For example, the network interface 416 may support communication via telecommunications networks such as cellular communication networks, satellite networks, and the like.

Input/output devices 418 may, in some implementations, include one or more displays, imaging devices, thermal sensors, infrared sensors, time of flight sensors, accelerometers, pressure sensors, weather sensors, etc. Multiple input/output devices 418 may be present and controlled by the AAV control system 310. One or more of these sensors may be utilized to assist in the landing as well as avoid obstacles during flight.

As shown in FIG. 4, the memory may include program instructions 422 which may be configured to implement the example processes and/or sub-processes described herein. The data storage 424 may include various data stores for maintaining data items that may be provided for determining flight paths, retrieving items, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 310 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 310 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 310. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the AAV control system 310 may be transmitted to the AAV control system 310 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AAV control system configurations.

While the functional components of the example AAV 300 are discussed herein as part of the AAV 300, in other implementations, one or more of the functional components may be distributed throughout the materials handling facility and/or implemented as part of the materials handling facility management system 250. For example, one or more of the aspects of the program instructions 422 may be implemented as part of the materials handling facility management system 250.

Figure 5:
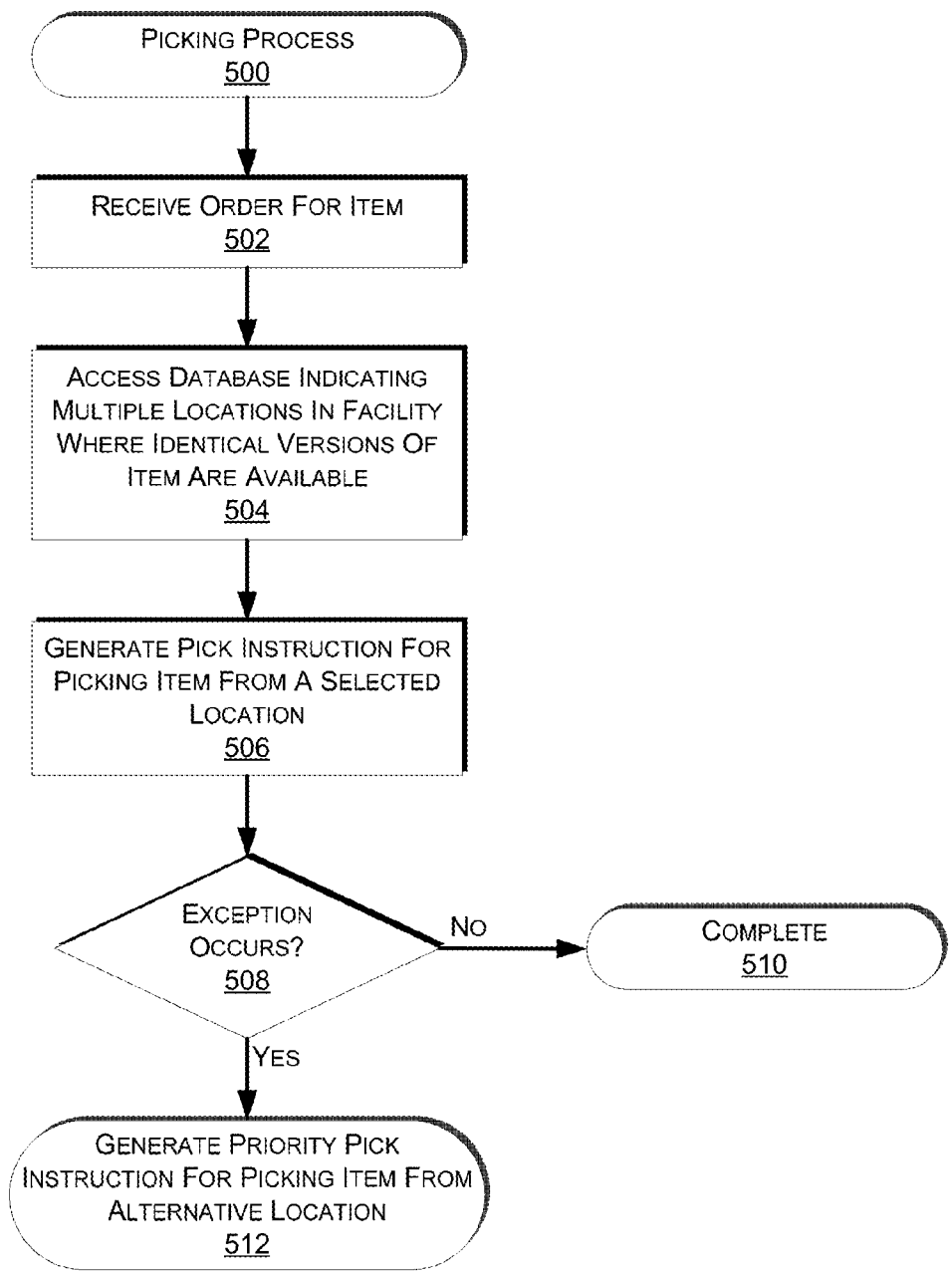
FIG. 5 depicts a flow diagram of a picking process, according to some implementations.

FIG. 5 is a flow diagram of an example picking process 500, according to some implementations. The process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins with the receipt of an order for an item, as in 502. Once the order for the item is received, a database is accessed which may indicate multiple locations in a materials handling facility where identical versions of the item are indicated to be available for picking, as in 504. Once the database is accessed for determining the possible locations from which the item may be picked, a pick instruction is generated for picking the item from a selected one of the possible locations, as in 506.

After the pick instruction for picking the item has been generated (e.g., at the time when the pick is first executed, or at a later time such as during packing or sorting of the item), a determination is made as to whether an exception has occurred, as in 508. For example, an exception may be indicated if the item is missing or otherwise is not actually at the selected location from which it was supposed to be picked. As another example, the item may be picked but may be determined to be damaged or otherwise unsuitable for inclusion in the order that is to be fulfilled. In such instances, an agent who was responsible for the picking or other processing of the item may make a corresponding entry on an electronic input device or other mechanism to indicate to the system what has happened with regard to the exception that has occurred. As a result, the agent may be provided with further instructions, such as to transport any other items from the order to a processing location (e.g., a problem solve station), as will be described in more detail below. If no exception is indicated as having occurred, the process completes, as in 510. If an exception is indicated as having occurred, a priority pick instruction may be automatically generated for picking the item from an alternative location in the facility, as in 512.

In various implementations, priority pick instructions may generally be considered to be more urgent than regular pick instructions. For example, a priority pick instruction may be associated with a last item that is otherwise blocking a shipment for an order from leaving the materials handling facility. In general, given the nature of certain types of priority pick instructions which may not be generated until an exception is discovered, such priority pick instructions may be generated relatively close to a critical pull time for an item. As will be described in more detail below with respect to FIG. 6, in various implementations an AAV may be associated with the priority pick instruction for rapidly transporting the priority pick item to a processing delivery location.

Figure 6:
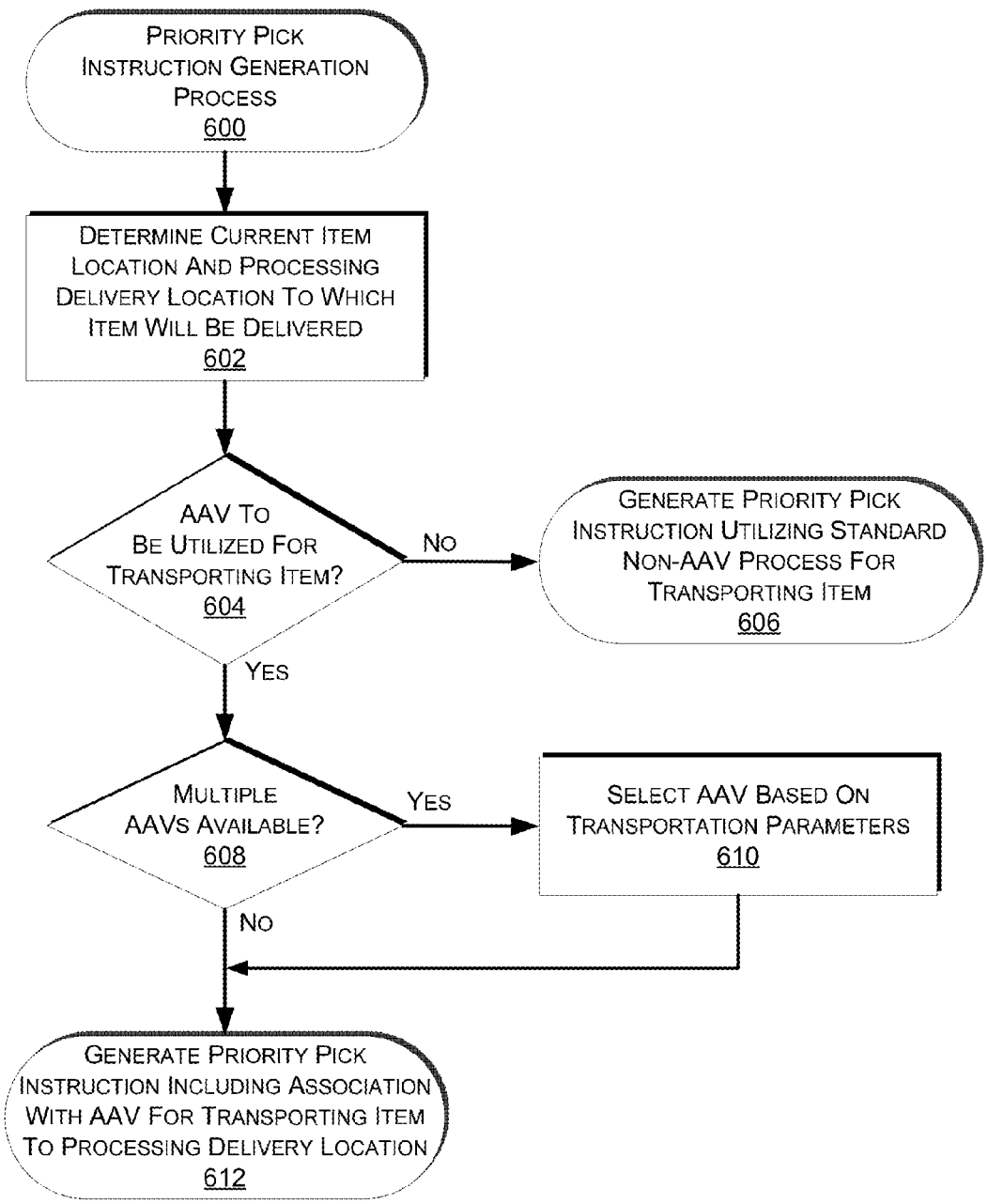
FIG. 6 depicts a flow diagram of a priority pick instruction generation process, according to some implementations.

FIG. 6 depicts a flow diagram of an example priority pick instruction generation process 600, according to some implementations. The example process begins by determining a current item location and a processing delivery location to which the item will be delivered, as in 602. For example, when an exception occurs, any additional items that are to be shipped with the priority pick item as part of the fulfillment of the order may be taken to a processing location (e.g., a problem solve station). In various implementations, the processing delivery location may be located at or near an associated processing location. For example, the processing delivery location may include an area where an AAV can safely land and/or drop off an item, which does not endanger human agents or otherwise interfere with other processing operations at an associated problem solve station or other processing location. In various implementations, the processing delivery location may also be associated with a conveyor, robotic agent or other transportation mechanism for transporting the priority pick item to the problem solve station or other processing location once the priority pick item is delivered by an AAV.

In various implementations, problem solve stations or other processing locations may be located throughout a materials handling facility, and may include designated locations where items in an order may be taken once an exception or other problem occurs. Once a priority pick item arrives at a problem solve station or other processing location, if there were other items from the order that were previously taken to the processing location, the priority pick item may be placed with the other items in the order so that all of the items can be processed together (e.g., for packing). In various implementations, the other items that are to be shipped with the priority pick item as part of the order may continue to be processed after the exception occurs, wherein the priority pick item will later be delivered to rejoin the other items at a point further along the processing path. For example, the other items may be further processed by sorting and/or packing operations, in which case the processing location may be designated as a location in the materials handling facility where the additional items will be after the sorting and/or packing operations have been performed.

Once the current item location and the processing delivery location are determined, a determination is made as to whether an AAV will be utilized for transporting the item to the processing delivery location, as in 604. If an AAV will not be utilized, a priority pick instruction is generated that utilizes standard non-AAV processes for transporting the item to the processing delivery location, as in 606. For example, a standard non-AAV process for transporting the item may include a human agent who is instructed in accordance with the pick instruction to travel through the materials handling facility to the current item location for picking the item, and then to carry the item back to the processing delivery location.

In various implementations, a time requirement for transporting the priority pick item may be utilized for determining whether a human agent or an AAV will be utilized for transporting the item. For example, a general time requirement for transporting an item may be established (e.g., as related to a critical pull time for the item) and may be compared to an expected travel time for transporting the item by either a human agent or an AAV in order to determine which should be utilized. In various implementations, this determination may be made on an individual case-by-case basis or as a general policy decision for average estimated travel times in a given materials handling facility. For example, in instances where the materials handling facility is relatively small and/or the current item location and the processing delivery location are otherwise close to one another and a human agent is nearby, the transportation process may be performed relatively quickly by the human agent. However, in instances where the materials handling facility is relatively large and the average separation distance is greater (e.g., including many aisles, turns, stairs, etc.) and/or the human agent is not nearby, it may require a significant amount of time for this transportation process to be performed by the human agent (e.g., 10, 15, 30 or more minutes). In such cases, an AAV may be utilized that is able to travel through the material handling facility more quickly (e.g., travelling between the same start and stop points as the human agent in just a few minutes to one minute or less). In various implementations, in addition to the relatively fast speed with which an AAV may be able to fly, the AAV may also be able to travel along a more direct path through the materials handling facility. For example, in some materials handling facilities an AAV may be able to fly over, under, or around certain obstacles (e.g. bays, safety barriers, etc.) and/or to utilize certain access ways and/or to travel between floors without utilizing staircases or other pathways that would otherwise be required for a human agent.

If an AAV is to be utilized for transporting the item, as in 604, a determination is made as to whether multiple AAVs may be available for transporting the item, as in 608. For example, multiple AAVs may be stationed throughout a materials handling facility and/or different sizes or types of AAVs may be available for transporting items. If multiple AAVs are available, a selection of one of the AAVs for transporting the item is made based on certain transportation parameters, as in 610. For example, the size or weight of an item may dictate whether a larger or more powerful AAV should be utilized. The different AAVs may also be in different stages of recharging their power supplies, in which case an assessment may be made to determine which AAVs currently have sufficient charging for transporting the item. An AAV may also be selected based on a current proximity to the item and/or a proximity to the processing delivery location where the item will be delivered.

Once an AAV is selected for transporting the item, as in 610, or if only a single AAV is available for transporting the item, as in 608, a priority pick instruction is generated including an association with the AAV for transporting the item to the processing delivery location, as in 612. In various implementations, the priority pick instruction may include directing an agent (e.g., human or robotic) to perform various functions that are associated with the priority pick. For example, the agent may be instructed to cease other activities or otherwise proceed to pick the priority pick item from its current location (e.g., a bin location which the agent may be stationed near or may need to travel to). In various implementations, the agent may be instructed to place the priority pick item in a specified location. For example, the agent may be instructed to place the priority pick item in the associated AAV that has landed at an item acquisition location, or may place the item at the item acquisition location from which the AAV may be able to automatically engage the item. Similarly, the agent may be instructed to place the item in a container that can be engaged by the AAV, and then place the container either in the AAV or at the item acquisition location.

In various implementations, the agent may also be instructed to perform various scanning or other identification operations as part of the priority pick. For example, identifiers may be included on the priority pick item, the bin from which the item is picked, a container in which the item may be placed, the item acquisition location and/or the AAV. Such identifiers may be scanned by the agent or otherwise identified each time the item is moved. In this manner, data may be provided that allows the current location and associations of the priority pick item to be tracked as the item is picked and transported. In addition, the AAV may also include scanning and electronic association capabilities, and may also include position tracking capabilities that allow its current position, and the corresponding position of an engaged priority pick item, to be tracked. In various implementations, the AAV may also determine or be provided with flight path instructions (e.g. for flying to the item acquisition location and/or subsequently flying to the processing delivery location where the item will be delivered), as will be described in more detail below with respect to FIG. 7.

Figure 7:
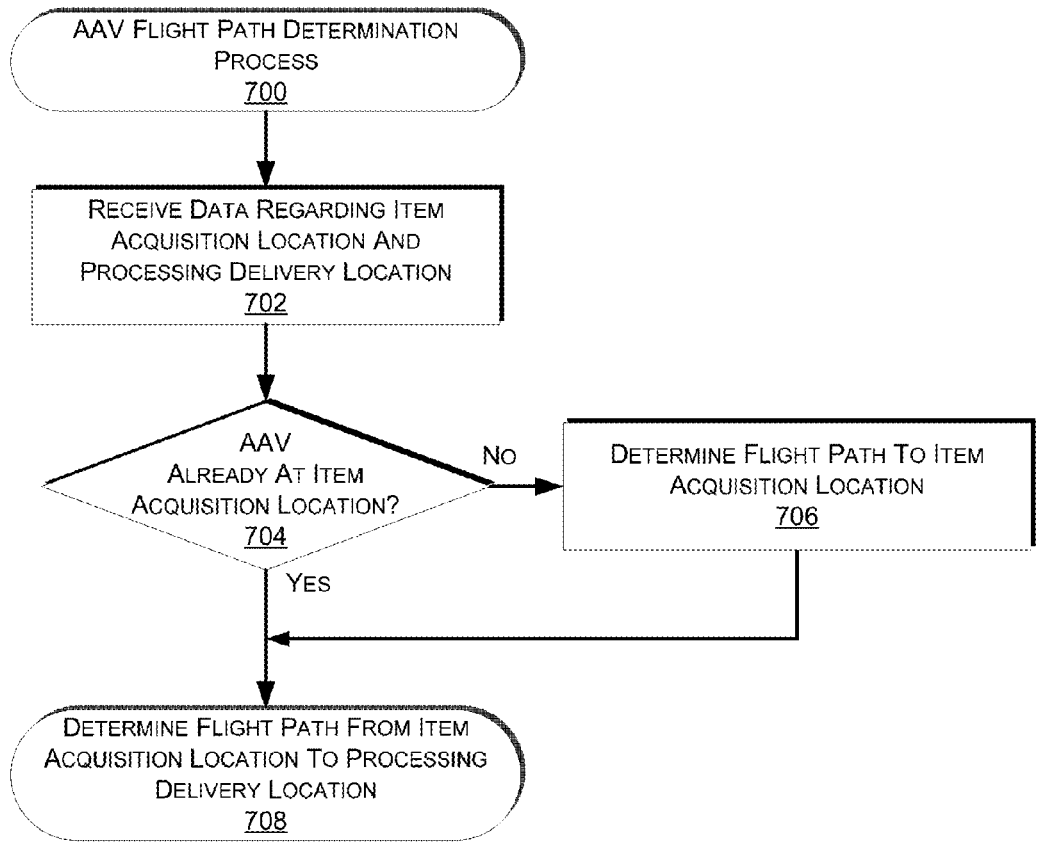
FIG. 7 depicts a flow diagram of an automated aerial vehicle flight path determination process, according to some implementations.

FIG. 7 depicts a flow diagram of an example AAV flight path determination process 700, according to some implementations. The example process begins with a receipt of data regarding an item acquisition location and a processing delivery location to which the item will be delivered, as in 702. For example, the data may include coordinates or other representations of the item acquisition location and the processing delivery location, which may be utilized in combination with a representation of the materials handling facility through which the AAV will navigate. Various systems may be utilized to assist with the navigation.

In various implementations, the item acquisition location may be near or at the current item location. For example, if the item will be picked by a human or robotic agent and placed in the AAV, the item acquisition location may be a designated landing area near the current item location. Similarly, the agent may place the item at an item acquisition location or on a conveyor or other transport mechanism for transporting the item to an item acquisition location where the AAV is able to land in order to engage the item. As another example, the AAV itself may have robotic capabilities for picking the item from its current location, in which case the item acquisition location may be the current item location (e.g., in a bin of a bay). Similarly, the processing delivery location may be near or at a processing location (e.g. a problem solve station) where other items from the order are stored. For example, the processing delivery location may include a landing or drop-off area that is near the processing location and from which the item may be manually or automatically transported to the processing location.

Once the data regarding the item acquisition location and the processing delivery location has been received, a determination is made as to whether the AAV is already at the item acquisition location, as in 704. For example, as described above with respect to FIG. 2, AAV stations 205 may be located throughout a materials handling facility, such that an AAV may already be at the item acquisition location. In such an instance an agent may be instructed to pick the item and place it in an engagement mechanism of a nearby AAV. If the AAV is not already at the item acquisition location, a flight path is determined to the item acquisition location, as in 706. Once the flight path from the AAV's current location to the item acquisition location is determined, as in 706, or if the AAV is already at the item acquisition location, as in 704, a flight path from the item acquisition location to the processing delivery location is determined, as in 708. The travel of an AAV to an item acquisition location will be described in more detail below with respect to FIG. 8, and the travel to a processing delivery location will be described in more detail below with respect to FIG. 9.

In various implementations, the flight paths to the item acquisition location and to the processing delivery location may be determined at different times. For example, once the flight path to the item acquisition location is determined, the AAV may be instructed to follow the flight path to arrive at the item acquisition location, before the subsequent flight path to the processing delivery location is determined. In other implementations, both the flight path to the item acquisition location and to the processing delivery location may be determined and stored before the AAV begins to travel. In various implementations, the flight paths may be determined by the AAV control system 310, or by the materials handling facility management system 250 or other remote computing resource, or by a combination of the above. For example, the materials handling facility management system 250 or other remote computing resource may send basic flight path instructions to the AAV (e.g., including the start and end points), while the AAV control system 310 may have navigation capabilities that allow the rest of the flight path to be determined.

Figure 8:
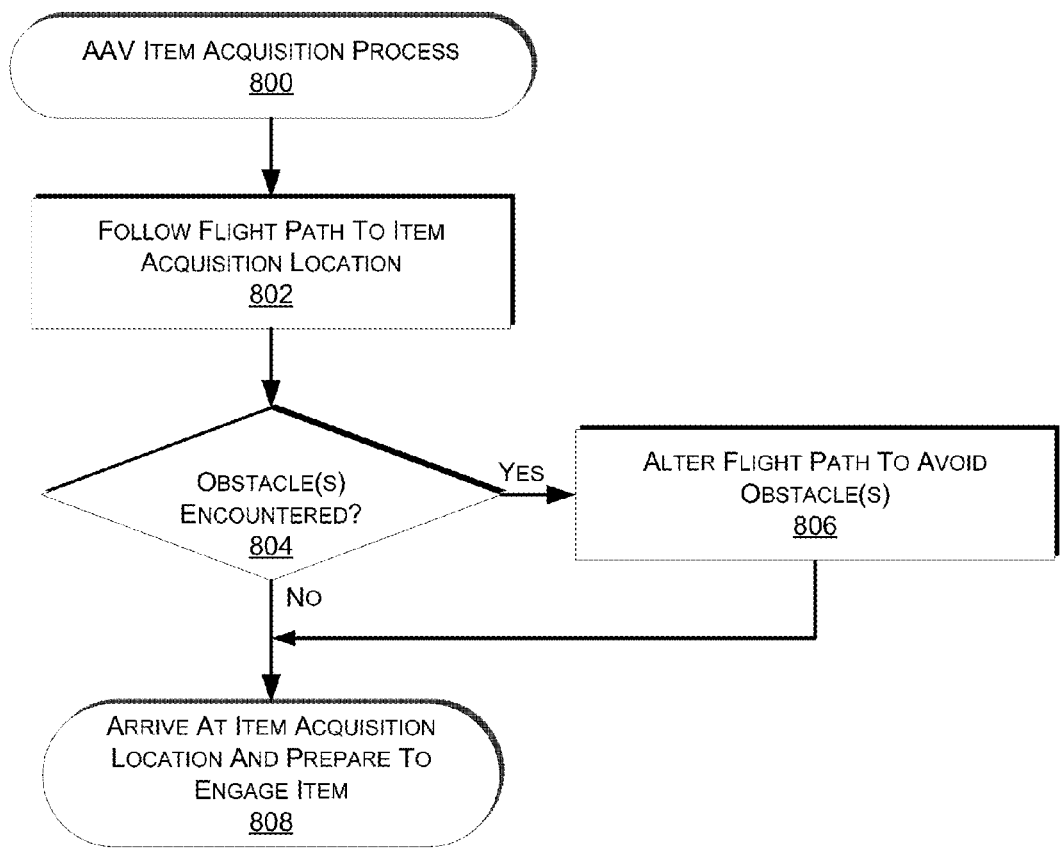
FIG. 8 depicts a flow diagram of an item acquisition process, according to some implementations.

FIG. 8 depicts a flow diagram of an example AAV item acquisition process 800, according to some implementations. The example process begins with the AAV following the flight path to the item acquisition location, as in 802. As the flight path is followed, a determination is made as to whether any obstacles are encountered, as in 804. If obstacles are encountered, the flight path is altered to avoid the obstacles, as in 806. For example, signs, bays, safety barriers or other objects may obstruct the flight path for the AAV, in which case alterations to the flight path may be made to avoid such obstacles. When an obstacle is determined to be a human, special precautions may be taken. In various implementations, if a human is near a landing area or is otherwise obstructing access to the item, special human avoidance techniques may be utilized. For example, the AAV may be instructed to wait until the human leaves the area before attempting to land or otherwise engage the item. As another example, the AAV and/or the materials handling facility management system 250 may also or alternatively provide a notification to the human that the AAV requires access to the area. In one implementation, the AAV and/or materials handling facility management system may provide an audible notification or a notification that is sent to the device of the human agent (e.g. a notification indicating that the AAV requires access to the area as part of an urgent priority pick operation).

Once the AAV has avoided any obstacles, as in 806, or has not encountered any obstacles along the flight path, as in 804, the AAV arrives at the item acquisition location and prepares to engage the item, as in 808. For example, an engagement mechanism of the AAV may be opened or otherwise made ready for receiving the item. In another example, the AAV and/or materials handling facility management system 250 may provide a notification to an agent that the AAV has arrived at the item acquisition location and is ready to receive the item. The engagement of the item and the subsequent travel to the processing delivery location by the AAV will be described in more detail below with respect to FIG. 9.

Figure 9:
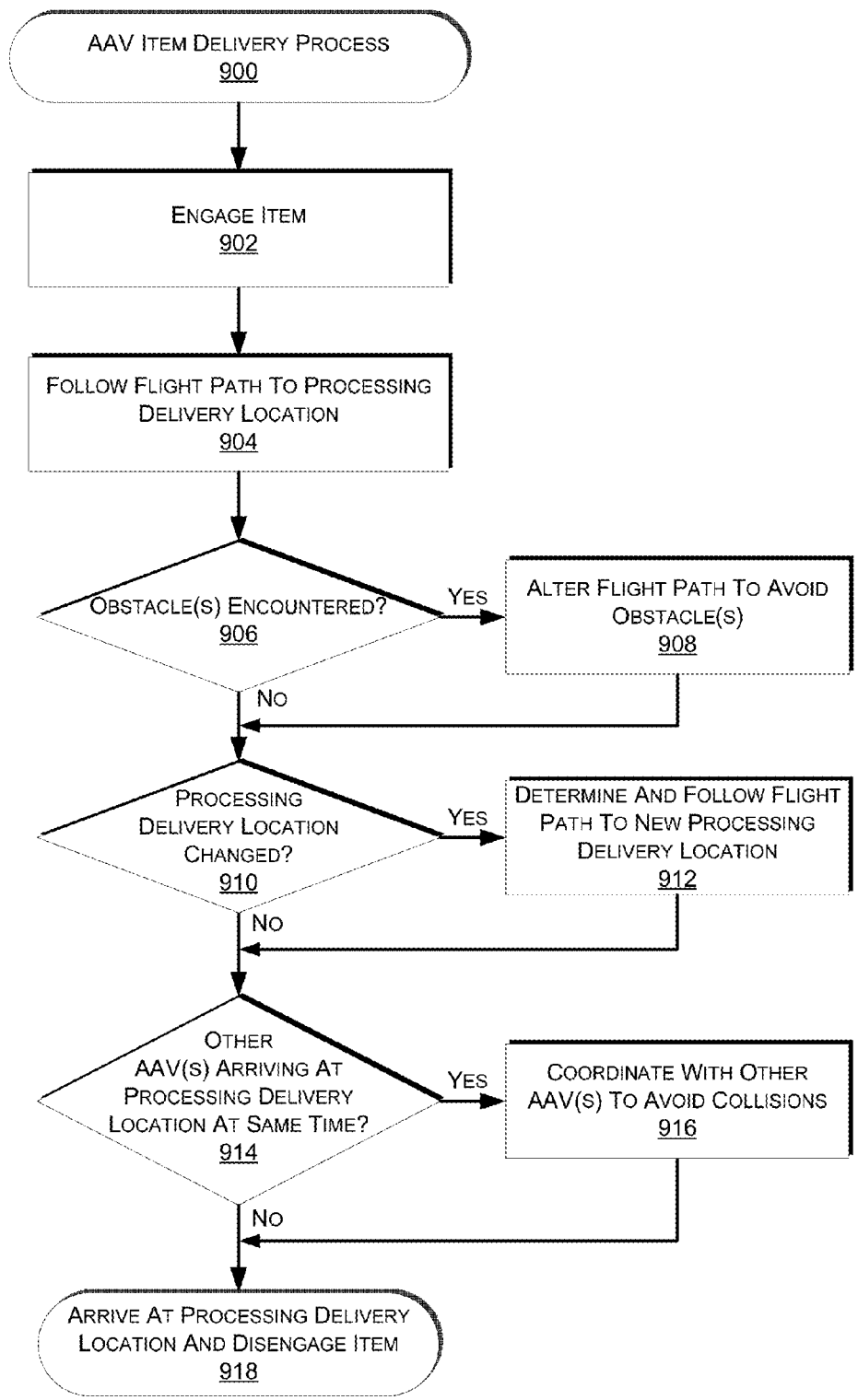
FIG. 9 depicts a flow diagram of an item delivery process, according to some implementations.

FIG. 9 depicts a flow diagram of an example AAV item delivery process 900, according to some implementations. The example process begins with the AAV engaging the item, as in 902. In various implementations, an engagement mechanism of the AAV may be utilized for engaging the item. For example, as described above with respect to FIG. 3, an engagement mechanism 314 may be configured so that a picking agent is able to place the item within the engagement mechanism. In another implementation, the AAV may be able to hover or land on top of or proximate to the item, wherein an engagement mechanism 314 is able to automatically engage the item.

In various implementations, a container may be utilized for holding the item, wherein the engagement mechanism engages the item by engaging the container. For example, specially shaped containers for use with the AAV may be provided at various locations in the materials handling facility, such that an agent is able to select one of the containers and place the item in the container for engagement by the AAV. In such a case, the container and/or the AAV may include an identifier which the agent can scan or otherwise identify for associating with the priority pick instruction and associated order for the item. In this manner, when the item is delivered to the processing location, the identifier on the container and/or AAV may be scanned or otherwise identified for associating the item with the priority pick instruction and/or the order for the item. In various implementations, such identifiers may include a barcode, a QR code, a bokode, a color, a shape, a character, a size, an RFID identifier or another type of active identifier. Such identifiers and corresponding associations may be helpful for insuring that the item is associated with the correct priority pick instruction and associated order. For example, different orders including items that are otherwise identical to one another may be processed at the same time, in which case it may be desirable to be able to distinguish with which order an item is associated.

Once the item is engaged by the AAV, the AAV follows the flight path toward the processing delivery location, as in 904. As the flight path is followed, a determination is made as to whether any obstacles are encountered, as in 906. If any obstacles are encountered, the flight path is altered to avoid the obstacles, as in 908, and as described in more detail above with respect to block 806 of FIG. 8. As the flight path is continued, a determination is made as to whether the processing delivery location has changed, as in 910. For example, additional items included in an order with the item may continue through various processing operations while the priority pick item is being retrieved by the AAV. In such a case, the additional items may continue to progress past an expected processing delivery location, in which case the destination processing delivery location may be updated as the AAV approaches. If the processing delivery location has changed, a flight path to the new processing delivery location is determined and followed, as in 912.

Once the flight path to the new processing delivery location is determined, as in 912, or if the processing delivery location has not changed, as in 910, a determination is made as to whether other AAVs are approaching the processing delivery location at the same time, as in 914. For example, as a departure time for a transportation unit (e.g., a truck) approaches, the frequency of items arriving that are to be included on the transportation unit may increase. As a result, more exceptions may be discovered and more priority pick instructions may correspondingly be issued, which may result in multiple AAVs approaching the processing delivery location at approximately the same time. If other AAVs are approaching, coordination is performed for the AAVs so as to avoid collisions, as in 916. For example, the AAV control system and/or materials handling facility management system may utilize collision avoidance techniques with respect to the AAVs. In various implementations, certain techniques may be utilized for prioritizing the landings of the AAVs. For example, the landing of an AAV with a more urgent priority pick instruction may be prioritized over the landing of an AAV with a less urgent priority pick instruction. Alternatively or in addition, the AAVs may follow a general protocol, such as "first come first served", wherein the first AAV that is approaching may generally be allowed to land first. In various implementations, the landings of the AAVs may also be prioritized based on the remaining power supply charge of each of the AAVs. For example, if an AAV's power supply is getting low, its landing may be prioritized over that of other AAVs with higher charge levels.

Once coordination has been performed for the AAV, as in 916, or if the AAV is the only AAV approaching the processing delivery location, as in 914, the AAV arrives at the processing delivery location and disengages the item, as in 918. In various implementations, as part of a landing of the AAV, the AAV and/or container carrying the item may be identified so that the item can be associated with the priority pick instruction and/or the associated order for the item. For example, the AAV and/or container carrying the item may include an identifier which can be scanned or otherwise determined (e.g. visually, electronically, etc.) so that the item can be properly associated with the correct priority pick instruction and/or associated order.

In various implementations, as part of the item acquisition process of FIG. 8 and the item delivery process of FIG. 9, the AAV may be periodically checked to make sure no problems are occurring that could interfere with the ability to acquire and/or transport the priority pick item. For example, factors such as a sufficient battery charge level, working communications capabilities, working sensors, etc. may be verified both before and during travel along a flight path. In various implementations, if a determination is made by the AAV and/or the materials handling facility management system that a problem is occurring with the AAV that could inhibit the ability to acquire and/or transport the priority pick item, alternative actions may be taken. For example, in such cases a different AAV may be dispatched to acquire and transport the priority pick item.

Figure 10:
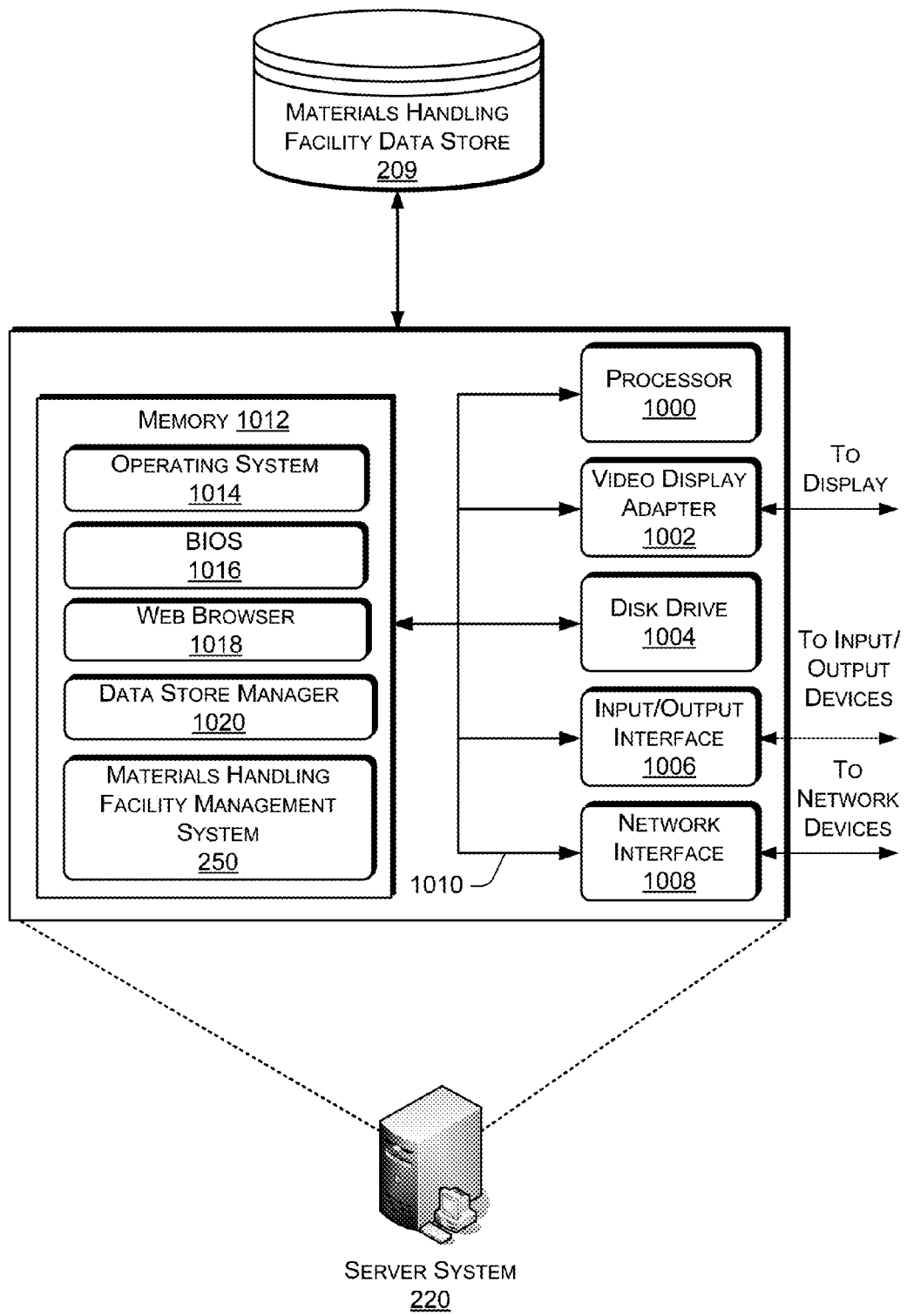
FIG. 10 is a block diagram of an illustrative implementation of a server system that may be used with various implementations.

FIG. 10 is a pictorial diagram of an illustrative implementation of a server system, such as the server system 220, that may be used in the implementations described herein. The server system 220 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an agent of the server system 220 to monitor and configure operation of the server system 220 and/or to provide information (e.g., when an exception is indicated during the processing of a user order). The input/output interface 1006 likewise communicates with external input/output devices not shown in FIG. 10, such as a mouse, keyboard, scanner, or other input and output devices that can be operated by an agent of the server system 220. The network interface 1008 includes hardware, software, or any combination thereof, to communicate with other computing devices. For example, the network interface 1008 may be configured to provide communications between the server system 220 and other computing devices, such as the AAV 300, via a network.

The memory 1012 generally comprises random access memory (RAM), read-only memory (ROM), flash memory, and/or other volatile or permanent memory. The memory 1012 is shown storing an operating system 1014 for controlling the operation of the server system 220. A binary input/output system (BIOS) 1016 for controlling the low-level operation of the server system 220 is also stored in the memory 1012.

The memory 1012 additionally stores program code and data for providing network services to the AAV 300 and/or the materials handling facility management system 250. Accordingly, the memory 1012 may store a browser application 1018. The browser application 1018 comprises computer executable instructions, that, when executed by the processor 1000, generate or otherwise obtain configurable markup documents such as Web pages. The browser application 1018 communicates with a data store manager application 1020 to facilitate data exchange between the data store 209 and the materials handling facility management system 250.

As used herein, the term "data store" refers to any device or combination of devices capable of storing, accessing and retrieving data, which may include any combination and number of data servers, databases, data storage devices and data storage media, in any standard, distributed or clustered environment. The server system 220 can include any appropriate hardware and software for integrating with the data store 209 as needed to execute aspects of one or more applications for the AAV 300, and/or the materials handling facility management system 250.

The data store 209 can include several separate data tables, databases or other data storage mechanisms and media for storing data relating to a particular aspect. For example, the illustrated data store 209 includes mechanisms for maintaining information related to operations, inventory, virtual representations of the materials handling facility, etc., which can be used to generate and deliver information to AAVs 300, the materials handling facility management system 250 and/or agents. It should be understood that there can be many other aspects that may be stored in the data store 209 and that additional data stores beyond the one illustrated may be included. The data store 209 is operable, through logic associated therewith, to receive instructions from the server system 220 and obtain, update or otherwise process data in response thereto.

The memory 1012 may also include the materials handling facility management system 250, discussed above. The materials handling facility management system 250 may be executable by the processor 1000 to implement one or more of the functions of the server system 220. In one implementation, the materials handling facility management system 250 may represent instructions embodied in one or more software programs stored in the memory 1012. In another implementation, the materials handling facility management system 250 can represent hardware, software instructions, or a combination thereof.

The server system 220, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for delivering a priority pick item to a processing delivery location in a facility, the system comprising:
an automated aerial vehicle, comprising:
a propulsion system to fly the automated aerial vehicle;
an engagement mechanism to engage an item;
a computing system, including:
one or more processors; and
a memory coupled to the one or more processors and storing program instructions that when executed by the one or more processors cause the one or more processors to at least:
receive an order for an item;
access a database indicating that the item is available at a first location and at a second location within a facility;
generate a first pick instruction for picking the item from the first location;
receive an indication of an exception occurring that signifies that the item that was indicated in the database as available at the first location will not be able to be utilized for fulfilling the order for the item;
in response to the receipt of the indication of the exception, generate a second pick instruction that is a priority pick instruction that is more urgent than the first pick instruction and which instructs a picking of the item from the second location and a transport of the item to a processing delivery location within the facility;
determine a travel path and a corresponding estimated travel time for a human agent to travel through the facility between the second location and the processing delivery location;
determine based at least in part on the estimated travel time that the human agent would not be able to meet a time requirement for transporting the priority pick item to the processing delivery location;
determine a flight path and a corresponding estimated travel time for an automated aerial vehicle to fly through the facility between the second location and the processing delivery location;
determine based at least in part on the estimated travel time that the automated aerial vehicle will be able to meet the time requirement for transporting the priority pick item to the processing delivery location;
determine that the automated aerial vehicle will be utilized to transport the priority pick item rather than the human agent based at least in part on the determination that the human agent would not be able to meet the time requirement for transporting the priority pick item to the processing delivery location; and
based at least in part on the determination that the automated aerial vehicle will be able to meet the time requirement for transporting the priority pick item to the processing delivery location, send instructions to the automated aerial vehicle to follow the flight path to transport the item from the second location to the processing delivery location.

2. The system of claim 1, wherein the program instructions when executed by the one or more processors further cause the one or more processors to at least:
determine a flight path over which the automated aerial vehicle travels for flying to an engaging location that is at or near the second location for engaging the item.

3. The system of claim 2, wherein the flight path is altered due to at least one of encountering an obstacle or receiving an indication that the processing delivery location has been changed.

4. The system of claim 1, wherein the exception that is indicated as occurring corresponds to at least one of a determination that the item is missing from the first location or that the item from the first location is damaged.

5. The system of claim 1, wherein the order for the item also includes one or more additional items that are stored at a processing location that is associated with the processing delivery location.

6. The system of claim 5, wherein after the exception is indicated as having occurred, the one or more additional items are further processed by at least one of a sorting or packing operation before arriving at the processing location.

7. A system for delivering a priority pick item to a processing delivery location, the system comprising:
   an automated aerial vehicle, including:
      at least one motor coupled to a propeller and configured to rotate the propeller;
      an engagement mechanism for engagement and transport of one or more items;
   a computing system, including:
      one or more processors; and
      a memory coupled to the one or more processors and storing program instructions that when executed by the one or more processors cause the one or more processors to at least:
         determine an item acquisition location for retrieving a priority pick item that is to be transported to a processing delivery location associated with a priority pick instruction, wherein the item acquisition location and the processing delivery location are located within a facility and the priority pick instruction is related to a priority pick that is generated for a priority pick item in response to an exception occurring during processing of a user order within a facility;
         determine a travel path and a corresponding estimated travel time for a human agent to travel through the facility between the item acquisition location and the processing delivery location;
         determine based at least in part on the estimated travel time that the human agent would not be able to meet a time requirement for transporting the priority pick item to the processing delivery location;
         determine a flight path and a corresponding estimated travel time for an automated aerial vehicle to fly through the facility between the item acquisition location and the processing delivery location;
         determine based at least in part on the estimated travel time that the automated aerial vehicle will be able to meet the time requirement for transporting the priority pick item to the processing delivery location;
         determine that the automated aerial vehicle will be utilized to transport the priority pick item rather than the human agent based at least in part on the determination that the human agent would not be able to meet the time requirement for transporting the priority pick item to the processing delivery location; and
         based at least in part on the determination that the automated aerial vehicle will be able to meet the time requirement for transporting the priority pick item to the processing delivery location, send instructions to the automated aerial vehicle to fly along the flight path to deliver the priority pick item to the processing delivery location; and an identifier that is utilized to associate the priority pick item with the priority pick instruction once the priority pick item is delivered to the processing delivery location.

8. The system as recited in claim 7, wherein at least one of:
   the identifier is included with the automated aerial vehicle such that it is scanned by an agent when the automated aerial vehicle lands at the processing delivery location with the priority pick item, or
   the identifier is included with a container that holds the priority pick item and which can be scanned after the automated aerial vehicle has disengaged the container at the processing delivery location.

9. The system as recited in claim 7, wherein the identifier includes at least one of a barcode, a QR code, a bokode, a color, a shape, a character, a size, an RFID identifier or another type of active identifier.

10. The system as recited in claim 7, wherein the processing delivery location includes a landing area for the automated aerial vehicle that is at or near a processing location that includes a problem solve station.

11. The system as recited in claim 7, wherein the priority pick item is engaged by landing the automated aerial vehicle so as to allow an agent to place the priority pick item in the engagement mechanism of the automated aerial vehicle.

12. The system as recited in claim 7, wherein the automated aerial vehicle further includes a robotic engagement mechanism that enables the automated aerial vehicle to engage the priority pick item without agent assistance.

13. The system as recited in claim 7, wherein the automated aerial vehicle further includes a sensor which is utilized to assist the automated aerial vehicle in flying along the flight path.

14. The system as recited in claim 7, wherein a location of the automated aerial vehicle is tracked as the automated aerial vehicle travels along the flight path.

15. A computer-implemented method, comprising:
   under control of one or more computing systems configured with executable instructions,
      determining an item acquisition location for retrieving a priority pick item that is to be transported to a processing delivery location associated with a priority pick instruction, wherein the item acquisition location and the processing delivery location are located within a facility;
      determining a travel path and a corresponding estimated travel time for a human agent to travel through the facility between the item acquisition location and the processing delivery location;
      determining based at least in part on the estimated travel time that the human agent would not be able to meet a time requirement for transporting the priority pick item to the processing delivery location;
      determining a flight path and a corresponding estimated travel time for an automated aerial vehicle to fly through the facility between the item acquisition location and the processing delivery location, wherein the automated aerial vehicle comprises a propulsion system to fly the automated aerial vehicle and an engagement mechanism to engage the priority pick item;
      determining based at least in part on the estimated travel time that the automated aerial vehicle will be able to meet the time requirement for transporting the priority pick item to the processing delivery location;

determining that the automated aerial vehicle will be utilized to transport the priority pick item rather than the human agent based at least in part on the determination that the human agent would not be able to meet the time requirement for transporting the priority pick item to the processing delivery location; and based at least in part on the determination that the automated aerial vehicle will be able to meet the time requirement for transporting the priority pick item to the processing delivery location, sending instructions to the automated aerial vehicle to follow the flight path to fly the priority pick item from the item acquisition location to the processing delivery location.

16. The computer-implemented method of claim 15, further comprising determining that one or more additional automated aerial vehicles will be approaching the processing delivery location at similar times as the automated aerial vehicle, and coordinating the landings of the automated aerial vehicle and the one or more additional automated aerial vehicles to avoid collisions between the automated aerial vehicles.

17. The computer-implemented method of claim 15, wherein the instructions to follow the flight path further instruct the automated aerial vehicle to fly from the processing delivery location to a designated landing area with charging capabilities for the automated aerial vehicle after the automated aerial vehicle has delivered the priority pick item to the processing delivery location.

18. The computer-implemented method of claim 15, further comprising selecting the automated aerial vehicle from a plurality of available automated aerial vehicles for delivering the priority pick item to the processing delivery location based on an evaluation of one or more delivery parameters.

19. The computer-implemented method of claim 18, wherein the evaluation of the one or more delivery parameters includes at least one of determining a distance from a current automated aerial vehicle location to the item acquisition location, determining a weight of the priority pick item, or determining a charge level of one or more of the automated aerial vehicles.

* * * * *